US008694733B2

(12) United States Patent
Krishnan et al.

(10) Patent No.: US 8,694,733 B2
(45) Date of Patent: Apr. 8, 2014

(54) SLAVE CONSISTENCY IN A SYNCHRONOUS REPLICATION ENVIRONMENT

(75) Inventors: Manavalan Krishnan, Fremont, CA (US); Darpan Dinker, Fremont, CA (US); Johann George, Sunnyvale, CA (US)

(73) Assignee: Sandisk Enterprise IP LLC, Milpitas, CA (US)

( * ) Notice: Subject to any disclaimer, the term of this patent is extended or adjusted under 35 U.S.C. 154(b) by 69 days.

(21) Appl. No.: 13/399,982

(22) Filed: Feb. 17, 2012

(65) Prior Publication Data
US 2013/0151467 A1    Jun. 13, 2013

Related U.S. Application Data

(63) Continuation-in-part of application No. 12/983,754, filed on Jan. 3, 2011, now Pat. No. 8,621,155, and a continuation-in-part of application No. 12/983,758, filed on Jan. 3, 2011, and a continuation-in-part of application No. 12/983,762, filed on Jan. 3, 2011.

(51) Int. Cl.
*G06F 12/00* (2006.01)
*G06F 17/30* (2006.01)
(52) U.S. Cl.
CPC .............. *G06F 17/30581* (2013.01)
USPC ........................................................ 711/133
(58) Field of Classification Search
CPC ............................................... G06F 17/30581
See application file for complete search history.

(56) References Cited

U.S. PATENT DOCUMENTS

| 4,916,605 A | 4/1990 | Beardsley et al. |
| 5,046,002 A | 9/1991 | Takashi et al. |
| 5,057,996 A | 10/1991 | Cutler et al. |
| 5,117,350 A | 5/1992 | Parrish et al. |
| 5,212,789 A | 5/1993 | Rago |
| 5,287,496 A | 2/1994 | Chen et al. |

(Continued)

FOREIGN PATENT DOCUMENTS

| EP | 1548600 B1 | 1/2007 |
| EP | 1746510 A1 | 1/2007 |

OTHER PUBLICATIONS

Ajmani, Automatic Software Upgrades for Distributed Systems, MIT, Sep. 2004, 164 pgs.

(Continued)

*Primary Examiner* — Hiep Nguyen
(74) *Attorney, Agent, or Firm* — Morgan, Lewis & Bockius LLP

(57) ABSTRACT

Approaches for replicating data in a distributed transactional system. At a first node of a cluster, a per-transaction write set, comprising a plurality of write operations, is committed against a first MySQL database. One or more per-transaction write sets are replicated from the first node to a second node. Upon receiving a read query, the second node parses the read query to identify a read set, calculates a write set conflict window for the read query, and upon determining that the read set conflicts with one or more write sets in the write set conflict window, waits to process the read query until all conflicting write sets are committed. However, upon determining that the read set does not conflict any write sets in the write set conflict window, the read query is processed without first committing any write transactions in the write set conflict window for the read query.

18 Claims, 3 Drawing Sheets

(56) References Cited

U.S. PATENT DOCUMENTS

| | | | |
|---|---|---|---|
| 5,297,258 A | 3/1994 | Hale et al. |
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |
| 5,603,001 A | 2/1997 | Sukegawa et al. |
| 5,611,057 A | 3/1997 | Pecone et al. |
| 5,613,071 A | 3/1997 | Rankin et al. |
| 5,680,579 A | 10/1997 | Young et al. |
| 5,692,149 A | 11/1997 | Lee |
| 5,701,480 A | 12/1997 | Raz |
| 5,742,787 A | 4/1998 | Talreja |
| 5,887,138 A | 3/1999 | Hagersten et al. |
| 5,897,661 A | 4/1999 | Baranovsky et al. |
| 5,897,664 A | 4/1999 | Nesheim et al. |
| 5,963,983 A | 10/1999 | Sakakura et al. |
| 6,000,006 A | 12/1999 | Bruce et al. |
| 6,052,815 A | 4/2000 | Zook |
| 6,130,759 A | 10/2000 | Blair |
| 6,141,692 A | 10/2000 | Loewenstein et al. |
| 6,216,126 B1 | 4/2001 | Ronstrom |
| 6,298,390 B1 | 10/2001 | Matena et al. |
| 6,308,169 B1 | 10/2001 | Ronstrom et al. |
| 6,434,144 B1 | 8/2002 | Romanov |
| 6,467,060 B1 | 10/2002 | Malakapalli et al. |
| 6,615,313 B2 | 9/2003 | Kato et al. |
| 6,658,526 B2 | 12/2003 | Nguyen et al. |
| 6,728,826 B2 | 4/2004 | Kaki et al. |
| 6,745,209 B2 | 6/2004 | Holenstein et al. |
| 6,874,044 B1 | 3/2005 | Chou et al. |
| 6,938,084 B2 | 8/2005 | Gamache et al. |
| 6,981,070 B1 | 12/2005 | Luk et al. |
| 7,003,586 B1 | 2/2006 | Bailey et al. |
| 7,010,521 B2 | 3/2006 | Hinshaw et al. |
| 7,043,621 B2 | 5/2006 | Merchant et al. |
| 7,082,481 B2 | 7/2006 | Lambrache et al. |
| 7,162,467 B2 | 1/2007 | Eshleman et al. |
| 7,200,718 B2 | 4/2007 | Duzett |
| 7,203,890 B1 | 4/2007 | Normoyle |
| 7,249,280 B2 | 7/2007 | Lamport et al. |
| 7,269,708 B2 | 9/2007 | Ware |
| 7,269,755 B2 | 9/2007 | Moshayedi et al. |
| 7,272,605 B1 | 9/2007 | Hinshaw et al. |
| 7,272,654 B1 | 9/2007 | Brendel |
| 7,281,160 B2 | 10/2007 | Stewart |
| 7,305,386 B2 | 12/2007 | Hinshaw et al. |
| 7,334,154 B2 | 2/2008 | Lorch et al. |
| 7,359,927 B1 | 4/2008 | Cardente |
| 7,383,290 B2 | 6/2008 | Mehra et al. |
| 7,406,487 B1 | 7/2008 | Gupta et al. |
| 7,417,992 B2 | 8/2008 | Krishnan |
| 7,467,265 B1* | 12/2008 | Tawri et al. ............ 711/161 |
| 7,529,882 B2 | 5/2009 | Wong |
| 7,542,968 B2 | 6/2009 | Yokomizo et al. |
| 7,562,162 B2 | 7/2009 | Kreiner et al. |
| 7,584,222 B1 | 9/2009 | Georgiev |
| 7,610,445 B1 | 10/2009 | Manus et al. |
| 7,647,449 B1 | 1/2010 | Roy et al. |
| 7,809,691 B1 | 10/2010 | Karmarkar et al. |
| 7,822,711 B1* | 10/2010 | Ranade ............ 707/622 |
| 7,885,923 B1* | 2/2011 | Tawri et al. ............ 707/610 |
| 7,917,472 B2 | 3/2011 | Persson |
| 8,015,352 B2 | 9/2011 | Zhang et al. |
| 8,018,729 B2 | 9/2011 | Skinner |
| 8,024,515 B2 | 9/2011 | Auerbach et al. |
| 8,037,349 B2 | 10/2011 | Mandagere et al. |
| 8,069,328 B2 | 11/2011 | Pyeon |
| 8,239,617 B1 | 8/2012 | Linnell |
| 8,261,289 B2 | 9/2012 | Kasravi et al. |
| 8,321,450 B2 | 11/2012 | Thatte et al. |
| 8,335,776 B2 | 12/2012 | Gokhale |
| 8,370,853 B2 | 2/2013 | Giampaolo et al. |
| 8,401,994 B2 | 3/2013 | Hoang et al. |
| 2002/0166031 A1 | 11/2002 | Chen et al. |
| 2002/0184239 A1 | 12/2002 | Mosher, Jr. et al. |
| 2003/0016596 A1 | 1/2003 | Chiquoine et al. |
| 2003/0097610 A1 | 5/2003 | Hofner |
| 2003/0177408 A1 | 9/2003 | Fields et al. |
| 2003/0220985 A1 | 11/2003 | Kawamoto et al. |
| 2004/0010502 A1 | 1/2004 | Bomfim et al. |
| 2004/0078379 A1 | 4/2004 | Hinshaw et al. |
| 2004/0143562 A1 | 7/2004 | Chen et al. |
| 2004/0148283 A1 | 7/2004 | Harris et al. |
| 2004/0172494 A1 | 9/2004 | Pettey et al. |
| 2004/0205151 A1 | 10/2004 | Sprigg et al. |
| 2004/0230862 A1 | 11/2004 | Merchant et al. |
| 2004/0267835 A1 | 12/2004 | Zwilling et al. |
| 2005/0005074 A1 | 1/2005 | Landin et al. |
| 2005/0021565 A1 | 1/2005 | Kapoor et al. |
| 2005/0027701 A1 | 2/2005 | Zane et al. |
| 2005/0028134 A1 | 2/2005 | Zane et al. |
| 2005/0034048 A1 | 2/2005 | Nemawarkar et al. |
| 2005/0081091 A1 | 4/2005 | Bartfai et al. |
| 2005/0086413 A1 | 4/2005 | Lee et al. |
| 2005/0120133 A1 | 6/2005 | Slack-Smith |
| 2005/0131964 A1 | 6/2005 | Saxena |
| 2005/0240635 A1 | 10/2005 | Kapoor et al. |
| 2005/0246487 A1 | 11/2005 | Ergan et al. |
| 2006/0059428 A1 | 3/2006 | Humphries et al. |
| 2006/0161530 A1 | 7/2006 | Biswal et al. |
| 2006/0174063 A1 | 8/2006 | Soules et al. |
| 2006/0174069 A1 | 8/2006 | Shaw et al. |
| 2006/0179083 A1 | 8/2006 | Kulkarni et al. |
| 2006/0195648 A1 | 8/2006 | Chandrasekaran et al. |
| 2006/0212795 A1 | 9/2006 | Cottrille et al. |
| 2006/0218210 A1 | 9/2006 | Sarma et al. |
| 2006/0242163 A1 | 10/2006 | Miller et al. |
| 2006/0253724 A1 | 11/2006 | Zhang |
| 2007/0043790 A1 | 2/2007 | Kryger |
| 2007/0143368 A1* | 6/2007 | Lundsgaard et al. ......... 707/204 |
| 2007/0174541 A1 | 7/2007 | Chandrasekaran et al. |
| 2007/0234182 A1 | 10/2007 | Wickeraad et al. |
| 2007/0276784 A1 | 11/2007 | Piedmonte |
| 2007/0283079 A1 | 12/2007 | Iwamura et al. |
| 2007/0288692 A1 | 12/2007 | Bruce et al. |
| 2007/0288792 A1 | 12/2007 | Thorpe et al. |
| 2007/0294564 A1 | 12/2007 | Reddin et al. |
| 2007/0299816 A1 | 12/2007 | Arora et al. |
| 2008/0034076 A1 | 2/2008 | Ishikawa et al. |
| 2008/0034174 A1 | 2/2008 | Traister et al. |
| 2008/0034249 A1 | 2/2008 | Husain et al. |
| 2008/0046538 A1 | 2/2008 | Susarla et al. |
| 2008/0046638 A1 | 2/2008 | Maheshwari et al. |
| 2008/0126706 A1 | 5/2008 | Newport et al. |
| 2008/0288713 A1 | 11/2008 | Lee et al. |
| 2009/0006500 A1 | 1/2009 | Shiozawa et al. |
| 2009/0006681 A1 | 1/2009 | Hubert et al. |
| 2009/0006888 A1 | 1/2009 | Bernhard et al. |
| 2009/0019456 A1 | 1/2009 | Saxena et al. |
| 2009/0024871 A1 | 1/2009 | Emaru et al. |
| 2009/0030943 A1 | 1/2009 | Kall |
| 2009/0070530 A1 | 3/2009 | Satoyama et al. |
| 2009/0150599 A1 | 6/2009 | Bennett |
| 2009/0177666 A1 | 7/2009 | Kaneda |
| 2010/0125695 A1 | 5/2010 | Wu et al. |
| 2010/0241895 A1 | 9/2010 | Li et al. |
| 2010/0262762 A1 | 10/2010 | Borchers et al. |
| 2010/0318821 A1* | 12/2010 | Kwan et al. ............ 713/320 |
| 2011/0022566 A1 | 1/2011 | Beaverson et al. |
| 2011/0082985 A1 | 4/2011 | Haines et al. |
| 2011/0099420 A1 | 4/2011 | MacDonald McAlister |
| 2011/0167038 A1 | 7/2011 | Wang et al. |
| 2011/0179279 A1 | 7/2011 | Greevenbosch et al. |
| 2011/0185147 A1 | 7/2011 | Hatfield et al. |

OTHER PUBLICATIONS

Amza, Data Replication Strategies for Fault Tolerance and Availability on Commodity Clusters, 2000, 9 pgs.
bsn-modulestore, Versioning Concept, Oct. 13, 2010, 2 pgs.
Btrfs, http://en.wikipedia.org, Oct. 3, 2011, 9 pgs.
Buchholz, The Structure of the Reiser File System, Jan. 26, 2006, 21 pgs.

(56) References Cited

OTHER PUBLICATIONS

Chacon, Git, The Fast Version Control System, Oct. 3, 2011, 3 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org, Oct. 2, 2011, 6 pages.
Module: Mongoid: Versioning, http://rdoc.info, Documentation by YARD 0.7.2, 6 pages Oct. 3, 2011.
Noach, Database Schema under Version Control, code.openarck.org, Apr. 22, 2010, 6 pages.
Reiser FS, http://enwikipedia.org, Sep. 17, 2011, 5 pgs.
Rice, Extension Versioning, Update and Compatibility, Aug. 9, 2011, 11 pgs.
Rice, Toolkit Version Format, Aug. 19, 2011, 4 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
Vijaykumar, Speculative Versioning Cache, Dec. 1, 2011, 13 pgs.
WAFL—Write Anywhere File Layout, 1999, 1 pg.
Write Anywhere File Layout, Sep. 9, 2011, 2 pgs.
ZFS, , http://en.wikipedia.org Sep. 30, 2011, 18 pgs.

\* cited by examiner

US 8,694,733 B2

SLAVE CONSISTENCY IN A SYNCHRONOUS REPLICATION ENVIRONMENT

RELATED APPLICATION DATA

This application is a continuation-in-part of, and claims priority to, U.S. non-provisional patent application Ser. No. 12/983,754, entitled "Efficient Flash-Memory Based Object Store," filed on Jan. 3, 2011, invented by John Busch et al., the entire contents of which are incorporated by reference for all purposes as if fully set forth herein.

This application is also a continuation-in-part of, and claims priority to, U.S. non-provisional patent application Ser. No. 12/983,758, entitled "Flexible Way of Specifying Storage Attributes in a Flash-Memory Based Object Store," filed on Jan. 3, 2011, invented by Darryl Ouye et al., the entire contents of which are incorporated by reference for all purposes as if fully set forth herein.

This application is also a continuation-in-part of, and claims priority to, U.S. non-provisional patent application Ser. No. 12/983,762, entitled "Minimizing Write Operations to a Flash Memory-Based Object Store," filed on Jan. 3, 2011, invented by Darpan Dinker, the entire contents of which are incorporated by reference for all purposes as if fully set forth herein.

FIELD OF THE INVENTION

The present invention generally relates to ensuring data consistency across nodes of a synchronous replication cluster.

BACKGROUND

MySQL (a trademark of MySQL AB Limited Company or its successors) is a popular open source database management system. Natively, MySQL may be configured to replicate data from a master node to a slave node asynchronously or semi-synchronously, but not synchronously.

In asynchronous data replication, data is replicated from a master node to a slave node independent of when transactions are committed at the master node. Thus, transactions may be committed at the master node without consideration to when the transactions will be replicated to the slave node. Asynchronous replication therefore enables transactions to be committed relatively quickly at the master node, but if the master node becomes inoperable, there is no guarantee that a transaction committed at the master node has been replicated to the slave node. In asynchronous replication, the data stored on the slave node may not be current with data stored on the master node. As a result, read operations performed on the slave node may read out of date data. Further, if the master node crashes, then the slave node may not have the most recent set of data, resulting in data loss.

In semi-synchronous replication, a transaction is only committed at the master node when the master node receives acknowledgement that the slave node has received a copy of the transaction. Thus, when a transaction is committed at the master node, there is a guarantee that the slave node has at least received the transaction.

In synchronous replication, a transaction is only committed at the master node when the master node receives acknowledgement that the slave node has committed the transaction. Thus, when a transaction is committed at the master node, there is a guarantee that the slave node has also committed the transaction. Synchronous replication therefore requires additional time to commit a transaction at the master node than compared to asynchronous replication; however, if the master node becomes inoperable, there is a guarantee that the state of the database maintained by the slave node is consistent with the state of the database at the master node prior to the master node becoming inoperable.

MySQL may be configured to employ a third party library to provide additional functionality to a MySQL installation. For example, MySQL may be used in conjunction with a third party synchronous replication library, such as Galera. A MySQL server integrated with the Galera library enables a plurality of MySQL servers to interact with each other in a master-slave synchronous replication relationship.

In a Galera-based master-slave MySQL synchronous replication cluster, one MySQL server functions as a master and one or more MySQL servers function as a slave. The MySQL master server can handle both read and write requests while a MySQL slave server can handle only read requests. MySQL clients may only send write transactions to the MySQL master server but may send read transactions to either the MySQL master server or any MySQL slave servers.

A write set is prepared at the master for each MySQL write transaction initiated at the master. A write set is a set of information that may be used to perform the write operations that are specified by the requested MySQL write transaction. The write set is replicated from the master to each slave and is used by each slave to perform the write operations that are specified by the requested write transaction at the slave. Each slave uses write sets to commit the write transaction.

In a Galera-based master-slave MySQL synchronous replication cluster, write transactions received at a MySQL master server are replicated synchronously to each MySQL slave server. When a MySQL slave server receives a particular read query, to ensure data consistency, the MySQL slave server waits for all transactions, received by the MySQL slave server prior to the particular read query, to be committed prior to processing the particular read query. Unfortunately, if the MySQL master server receives a large volume of write transactions, then the performance of performing read queries at each MySQL slave server is poor.

Discussion in this section is meant to provide an understanding of prior approaches to the reader as they relate to embodiments of the invention. However, the disadvantages of prior approaches discussed in this section are not meant to be an admission that such disadvantages were publically known. Consequently, recognition of the disadvantages of the prior art discussed herein is not meant to be construed as being within the prior art simply by virtue of its inclusion in this section alone.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for ensuring data consistency across nodes of a MySQL synchronous replication cluster are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Slave Consistency

Figure 1:
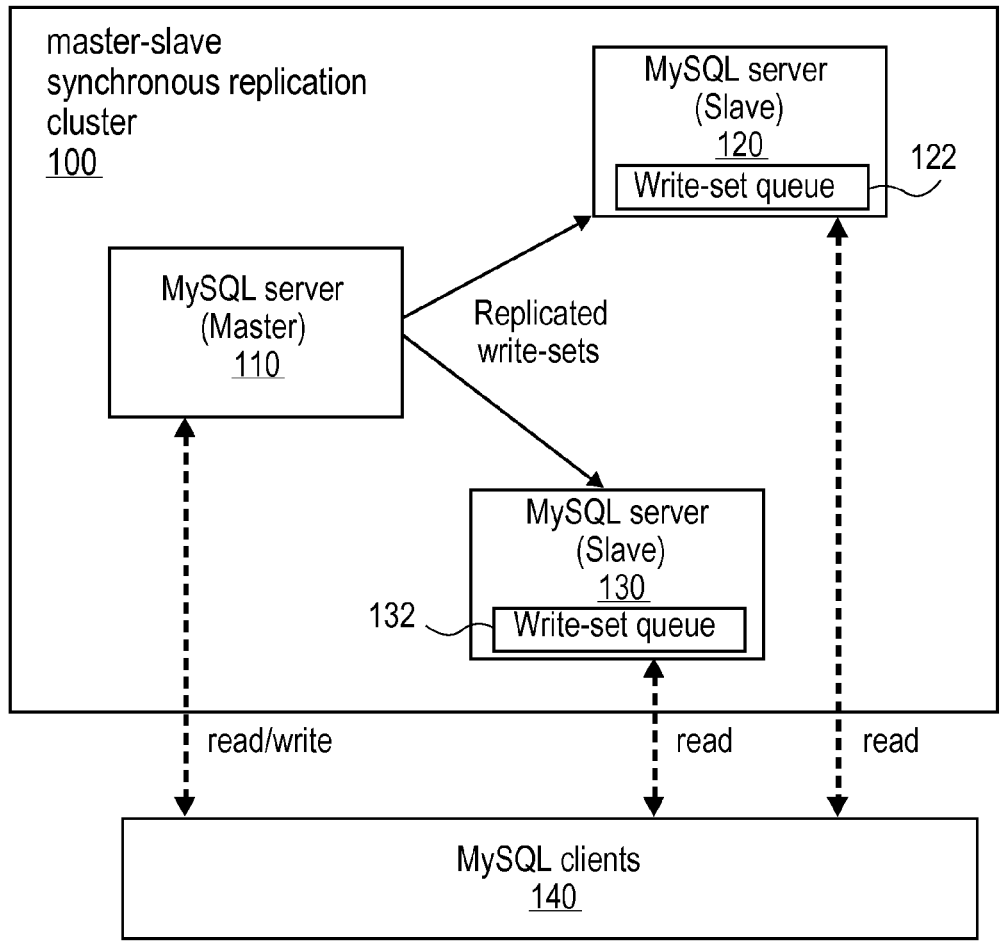
FIG. 1 is a block diagram of MySQL synchronous replication cluster according to an embodiment of the invention.

Embodiments of the invention ensure consistency between MySQL databases maintained at different nodes of a MySQL synchronous replication cluster in an efficient manner. FIG. 1 is a block diagram of MySQL synchronous replication cluster 100 according to an embodiment of the invention. As shown in FIG. 1, MySQL synchronous replication cluster 100 includes MySQL master server 110 and MySQL slave servers 120 and 130. Also depicted in FIG. 1 are one or more MySQL clients 140. One or more MySQL clients 140 issue read and write requests to MySQL master server 110 and read requests to MySQL slave servers 120 and 130. While only two MySQL slave servers are depicted in MySQL synchronous replication cluster 100 in FIG. 1, MySQL synchronous replication cluster 100 may comprise any number of MySQL slave servers.

Each MySQL server in MySQL synchronous replication cluster 100, regardless of whether it is a master server or a slave server, may be configured to use a third party synchronous replication library, such as Galera. Using such a third party synchronous replication library, a node of a cluster acting as a master may replicate data synchronously to the other nodes of the cluster that act as slaves. The master node can handle both read and write requests from MySQL clients 140 while slave nodes can handle only read requests from MySQL clients 140.

When MySQL master server 110 receives a write request from a particular MySQL client, MySQL master server 110 performs the requested write transaction against a MySQL database maintained by MySQL master server 110. Thereafter, prior to committing the transaction, MySQL master server 110 replicates the write set for the transaction to each MySQL slave server in the MySQL synchronous replication cluster 100 (for example, MySQL slave servers 120 and 130 in FIG. 1). When a MySQL slave server receives the write set from the MySQL master server, each MySQL slave server stores the write set in a write-set queue until the MySQL slave server can process the write set. For example, upon MySQL slave server 120 receiving a write set from MySQL master server 110, MySQL slave server 122 stores the write set in write set queue 122 and acknowledges receipt of the write set to MySQL master server 110. Once MySQL master server 110 receives confirmation that each MySQL slave server has received the write set, then MySQL master server 110 commits the transaction.

Figure 2:
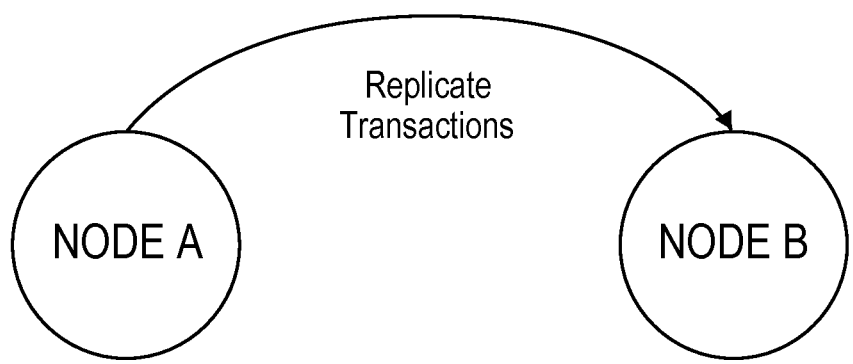
FIG. 2 is an illustration of two nodes in a replication relationship according to an embodiment.

To illustrate replicating a write set using an exemplary transaction, consider FIG. 2, which is an illustration of two nodes in a replication relationship according to an embodiment. Assume that transaction 1, as depicted in FIG. 2, is received at node A. After node A has performed transaction 1, node A will replicate the write set from node A to node B. A write set contains all the information about the write transaction that each slave requires to commit the transaction locally. Thus, in the example of FIG. 2, the write set comprises "Write B=A+3B" and "Write B=C+2A" for transaction 1. This write set will be replicated from node A to node B so node B can perform the write set against a database maintained by node B. After node A receives confirmation that node B has successfully received the write set for transaction 1, node A will commit transaction 1.

Figure 3:
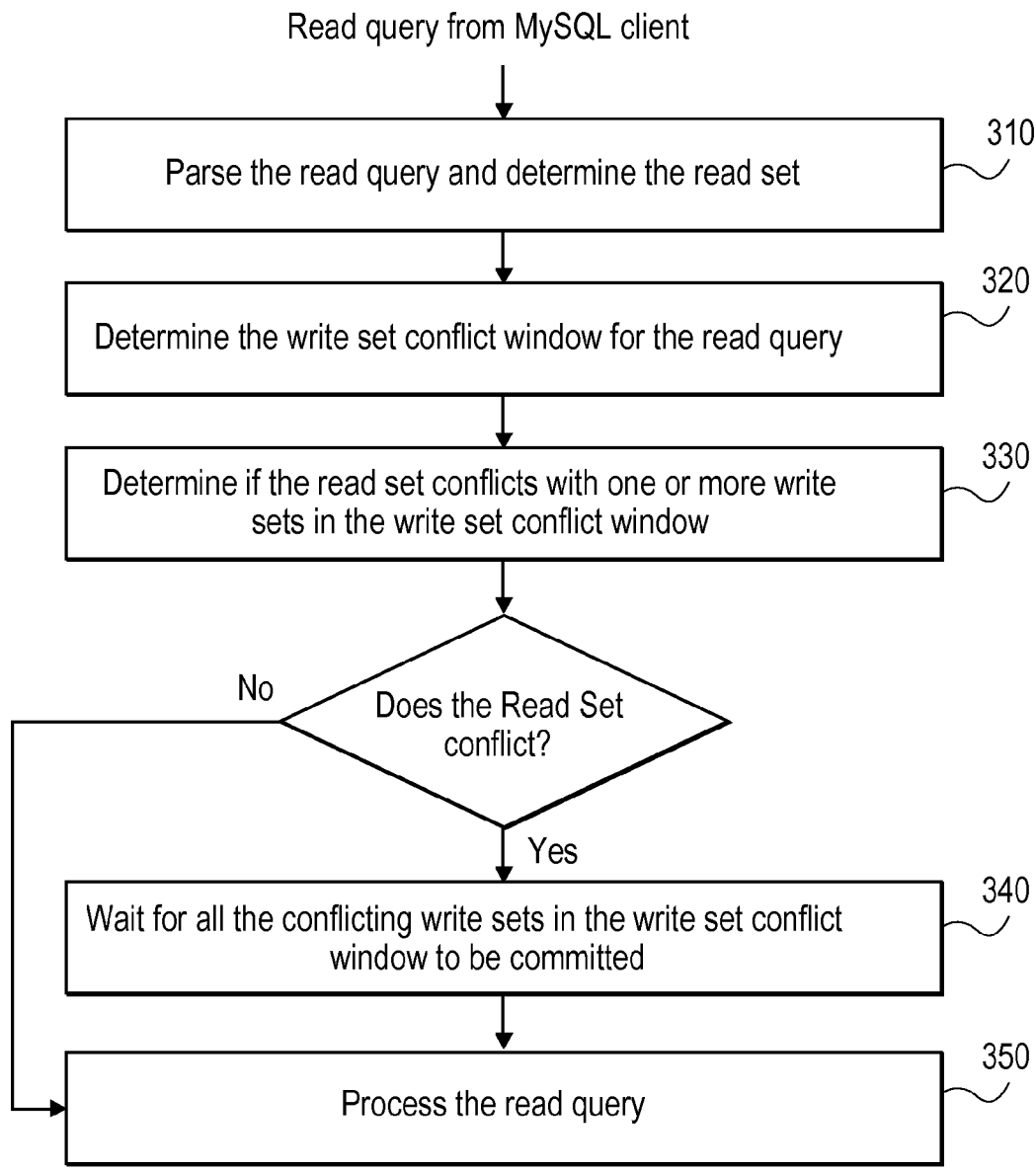
FIG. 3 is a flowchart illustrating the functional steps of performing a read query at a MySQL slave server in a MySQL synchronous replication cluster according to an embodiment of the invention.

Embodiments of the invention enable read queries to be processed by MySQL slave servers in less time than in prior approaches. FIG. 3 is a flowchart illustrating the functional steps of performing a read query at a MySQL slave server in a MySQL synchronous replication cluster according to an embodiment of the invention. The steps of FIG. 3 will be explained with reference to the illustrative MySQL synchronous replication cluster 100 depicted in FIG. 1.

In step 310, a MySQL client in one or more MySQL clients 140 sends a read query to MySQL slave server 120. MySQL slave server 120 parses the read query and determines the read set for the read query. A read set is the set of objects or values that are requested to be read in the read query. A read set is used to determine if the read query conflicts with one or more write-sets in a write set-conflict window. Non-limiting, illustrative examples of the information that a read-set would contain one or more databases that the read query depends on, one or more database tables that the read query depends on, and row and column information that the read query depends on.

A write-set conflict window for a read query is a set of (a) write-sets in the write-set queue waiting to be processed and (b) the write-sets currently being processed when the read query is received.

A specific example of performing step 310 shall be explained with reference to transaction 2 that corresponds to Read A, B, C. The read set for transaction 2 will correspond to any write operations that affect the values of A, B, or C. The write-set conflict window will thus be any transaction, either currently being processed by MySQL slave server 120 or residing in write-set queue 122 waiting to be processed, that changes the value of A, B, or C.

In step 320, MySQL slave server 120 determines the write set conflict window for the read query.

In step 330, MySQL slave server 120 determines if the read set determined in step 310 conflicts with one or more write sets in the write set conflict window determined in step 320. A read set is considered to conflict with a write set in a write set conflict window if committing the write set would result in a different value to read by the read query compared to what would have been read if the read query was processed outside of the read set conflict window.

In the prior example, the read set would conflict with a write set in the write set conflict window if a write set in the write set conflict window updates the value of A, B, or C. As shown in FIG. 3, if the read set does not conflict with a write set in the write set conflict window, then processing proceeds to step 350. On the other hand, if the read set does conflict with a write set in the write set conflict window, then processing proceeds to step 340.

In step 340, MySQL slave server 120 waits for all the conflicting write sets in the write set conflict window to be committed. Once all conflicting write sets in the write set conflict window are committed by MySQL slave server 120, processing proceeds to step 350.

In step 350, MySQL slave server 120 processes the read query. By performing the steps of FIG. 3, data read from any MySQL slave server is consistent with data maintained by MySQL master server 110. This is so because when MySQL master server 110 responds to a write transaction it is guaranteed that all MySQL slave servers in the cluster have the write set associated with the write transaction in the write set queue. Further, high read performance may be realized by embodiments since MySQL slave servers would only wait to process read query for the length of time that any conflict write sets exist in the write set conflict window.

Embodiments of the invention are directed towards ensuring data consistency across nodes of a MySQL synchronous replication cluster. Nodes of the MySQL synchronous replication cluster may be implemented on a wide variety of hardware. For example, nodes of the MySQL synchronous replication cluster may chiefly or wholly employ the use of solid state devices to persistently store data. In an embodiment, the architecture of embodiments is specifically tailored for using solid state devices in a fast, efficient, and scalable manner to obtain better performance than prior approaches. For example, each node of synchronous replication cluster 100 may correspond to a device 100 described in U.S. patent application Ser. No. 12/983,754.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for replicating data in a distributed transactional system, comprising:
    at a first node of a cluster, committing a per-transaction write set that comprises a plurality of write operations that are performed against a first database maintained by the first node;
    replicating one or more per-transaction write sets from the first node to a second node of the cluster; and
    upon receiving a read query at the second node, the second node performing:
        parsing the read query to identify a read set,
        calculating a write set conflict window for the read query, and
        upon determining that the read set conflicts with one or more write sets in the write set conflict window, waiting to process the read query until all write sets in the write set conflict window that conflict with the read query are committed.

2. The method of claim 1, wherein replicating is performed synchronously such that a write transaction is not committed at the first node until the first node receives acknowledgement, from the second node, that the write transaction is received at the second node.

3. The method of claim 1, wherein the first node operates as a master and the second node operates as a slave.

4. The method of claim 1, wherein the one or more per-transaction write sets, once received at the second node, are stored in a write-set queue prior to being processed by the second node.

5. The method of claim 1, further comprising:
    upon the second node determining that the read set does not conflict with any write sets in the write set conflict window for the read query, processing the read query without first committing any write transactions in the write set conflict window for the read query.

6. The method of claim 1, further comprising:
    replicating the one or more per-transaction write sets from the first node to one or more other nodes of the cluster besides the second node.

7. A non-transitory machine readable storage medium storing one or more sequences of instructions for replicating data in a distributed transactional system, wherein execution of the one or more sequences of instructions causes:
    at a first node of a cluster, committing a per-transaction write set that comprises a plurality of write operations that are performed against a first database maintained by the first node;
    replicating one or more per-transaction write sets from the first node to a second node of the cluster; and
    upon receiving a read query at the second node, the second node performing:
        parsing the read query to identify a read set,
        calculating a write set conflict window for the read query, and
        upon determining that the read set conflicts with one or more write sets in the write set conflict window, waiting to process the read query until all write sets in the write set conflict window that conflict with the read query are committed.

8. The non-transitory machine readable storage medium of claim 7, wherein replicating is performed synchronously such that a write transaction is not committed at the first node until the first node receives acknowledgement, from the second node, that the write transaction is received at the second node.

9. The non-transitory machine readable storage medium of claim 7, wherein the first node operates as a master and the second node operates as a slave.

10. The non-transitory machine readable storage medium of claim 7, wherein the one or more per-transaction write sets, once received at the second node, are stored in a write-set queue prior to being processed by the second node.

11. The non-transitory machine readable storage medium of claim 7, wherein execution of the one or more sequences of instructions further causes:
    upon the second node determining that the read set does not conflict with any write sets in the write set conflict window for the read query, processing the read query without first committing any write transactions in the write set conflict window for the read query.

12. The non-transitory machine readable storage medium of claim 7, wherein execution of the one or more sequences of instructions further causes replicating the one or more per-transaction write sets from the first node to one or more other nodes of the cluster besides the second node.

13. A system for replicating data in a distributed transactional system, comprising:
    one or more processors; and
    a machine readable storage medium storing one or more sequences of instructions, which when executed by the one or more processors, cause:
        at a first node of a cluster, committing a per-transaction write set that comprises a plurality of write operations that are performed against a first database maintained by the first node;
        replicating one or more per-transaction write sets from the first node to a second node of the cluster; and
        upon receiving a read query at the second node, the second node performing:
            parsing the read query to identify a read set,
            calculating a write set conflict window for the read query, and upon determining that the read set conflicts with one or more write sets in the write set conflict window, waiting to process the read query until all write sets in the write set conflict window that conflict with the read query are committed.

14. The system of claim 13, wherein replicating is performed synchronously such that a write transaction is not committed at the first node until the first node receives acknowledgement, from the second node, that the write transaction is received at the second node.

15. The system of claim 13, wherein the first node operates as a master and the second node operates as a slave.

16. The system of claim 13, wherein the one or more per-transaction write sets, once received at the second node, are, stored in a write-set queue prior to being processed by the second node.

17. The system of claim 13, wherein execution of the one or more sequences of instructions further causes:
  upon the second node determining that the read set does not conflict with any write sets in the write set conflict window for the read query, processing the read query without first committing any write transactions in the write set conflict window for the read query.

18. The system of claim 13, wherein execution of the one or more sequences of instructions further causes replicating the one or more per-transaction write sets from the first node to one or more other nodes of the cluster besides the second node.

* * * * *